United States Patent [19]
Olson

[11] Patent Number: 5,689,231
[45] Date of Patent: Nov. 18, 1997

[54] BRAKE MONITOR

[76] Inventor: Ronald E. Olson, 7945 Eight Mile Creek Rd., Pensacola, Fla. 32526

[21] Appl. No.: 637,451

[22] Filed: Apr. 25, 1996

[51] Int. Cl.$^6$ ................................................ B60Q 1/00
[52] U.S. Cl. .................. 340/453; 340/454; 116/208; 188/1.11
[58] Field of Search ........................... 340/454, 453, 340/452, 450.1; 116/208; 188/1.11 E, 1.11 WE

[56] References Cited

U.S. PATENT DOCUMENTS

| | | | |
|---|---|---|---|
| 2,873,436 | 2/1959 | Aurea | 340/52 |
| 3,997,887 | 12/1976 | Poynter | 340/242 |
| 4,642,603 | 2/1987 | Martinez, Jr. | 340/52 |
| 4,757,300 | 7/1988 | Sebalos | 340/52 |
| 4,855,712 | 8/1989 | Wiley, Jr. et al. | 340/453 |
| 5,285,190 | 2/1994 | Humphreys et al. | 340/453 |
| 5,320,198 | 6/1994 | Hoyt et al. | 116/208 |
| 5,339,069 | 8/1994 | Penner et al. | 340/454 |
| 5,358,076 | 10/1994 | Lucas | 116/208 |
| 5,433,296 | 7/1995 | Webberley | 188/1.11 |

*Primary Examiner*—Jeffery Hofsass
*Assistant Examiner*—Anh La
*Attorney, Agent, or Firm*—Peter Loffler

[57] ABSTRACT

A brake monitor for monitoring air brake adjustment as measured by push rod travel distance is comprised of a bracket straddling the push rod clevis of the brake system. The clevis pin connecting the push rod clevis to the slack adjuster and secured to the slack adjuster by a socket set screw, extends beyond the boundary of the push rod clevis and is received within a transducer attached to the bracket. Clevis pin rotation causes transducer output, corresponding to specific angular rotation of the clevis pin, which output is received by a display device of any appropriate type and communicated to the user. The system can be equipped with a black box-type memory for use by accident investigative authorities.

7 Claims, 3 Drawing Sheets

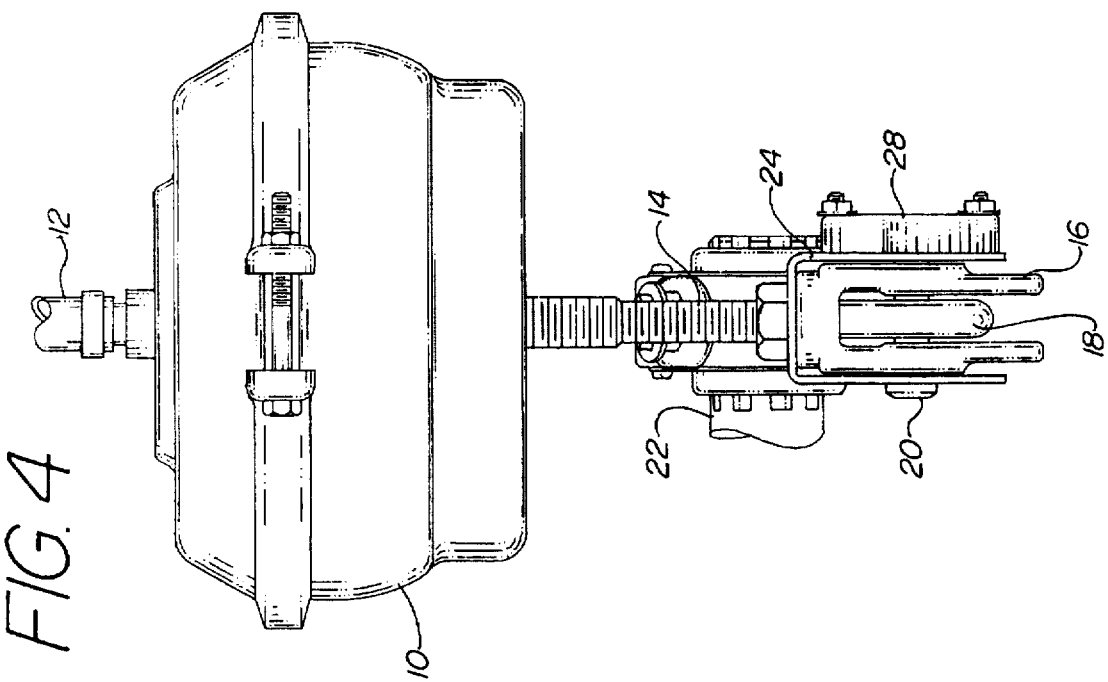
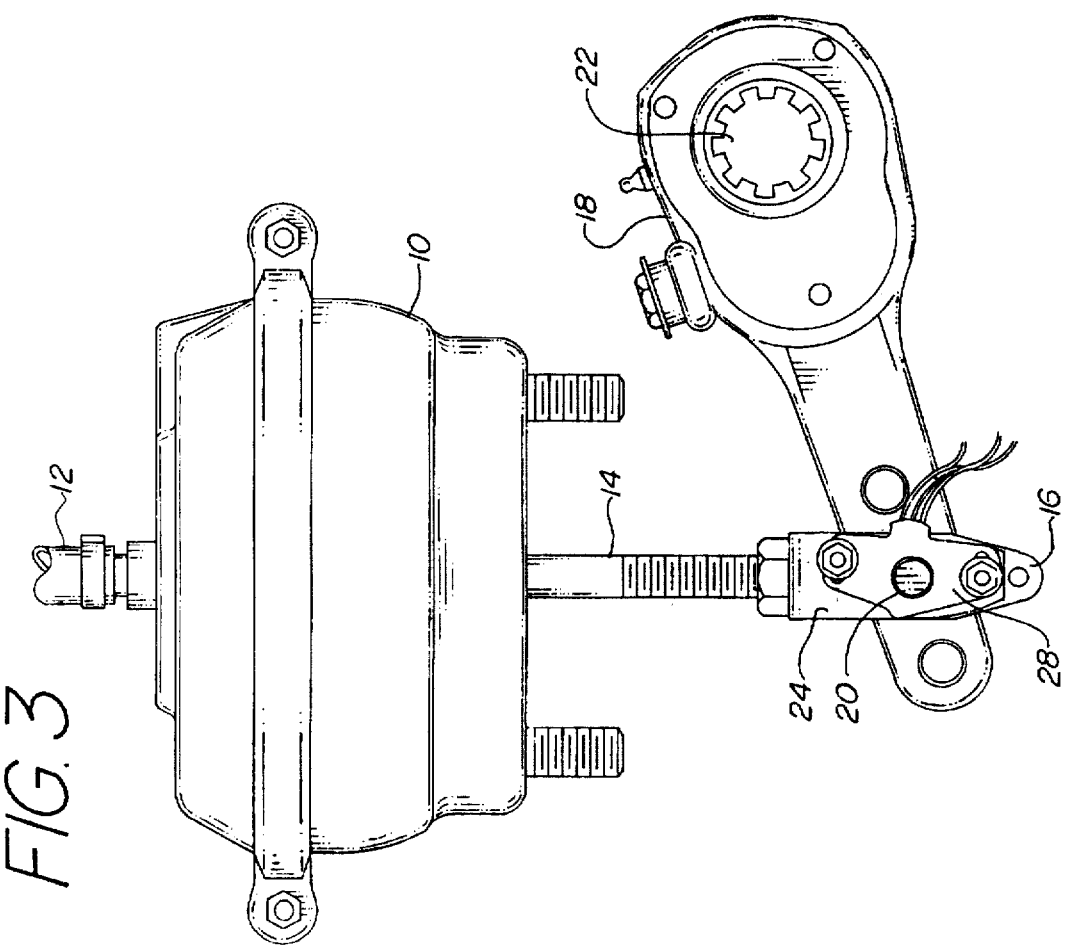

BRAKE MONITOR

BACKGROUND OF THE INVENTION

1. Field of the Invention

The present invention relates to a device for monitoring brake adjustment on vehicles such as trucks and tandem trailers.

2. Background of the Prior Art

State and federal mandates are in place requiring proper adjustment of brakes found on vehicles using air brake systems. Such vehicles have an air brake at each wheel or wheel pair. Current protocols require that the air brake push rod travel no more than those limits specified by federal and state authorities and brake manufactures. Specifications are determined by air chamber type. Each brake system must meet these operating levels in order for the vehicle to be considered safe to operate.

In order to assure vehicle safety, state and federal governments have established a series of inspection stations throughout the nation's roadway system. Brake adjustment, as measured by length of push rod travel, is one of the key aspects of the inspection that occurs at these stations. If any of the vehicle's brakes are found to beyond acceptable limits, the vehicle is prohibited from further travel until the condition is remedied.

In an effort to remedy out of adjustment brake systems, automatic slack adjusters have been provided. Such adjusters automatically remove any slack that develops in push rod travel and continually maintain the brake system within safe operating levels. However, not all vehicles are equipped with these slack adjusters. Furthermore, slack adjusters are susceptible to failure from external sources such as road dirt and grime, vehicle lubricants, and ice. Such failure is especially critical as the vehicle operator, believing that the brakes are continually being adjusted, will lessen his vigilance in inspecting this aspect of the vehicle.

Therefore, adjustment level monitors have been proposed that sense the travel of each push rod and activate an alarm, audio or visual, whenever a push rod is either marginally safe or unsafe. Such devices use many differing methods of measuring push rod travel with varying degrees of efficiency and reliability. The current state of the art of these devices appears to be found in U.S. Pat. No. 5,433,296 to Webberley which utilizes a linear transducer activated by a rod connected to and traveling in lock-step with the push rod. The transducer encodes the electrical signal generated by rod travel and reports the results to an in-cab display.

Although this device appears to work appropriately, it suffers from the same drawbacks that plague other monitoring devices. The Webberley device is mounted external to the existing brake system and introduces several additional parts to the system. This exposes the monitoring system to the same failure problems associated with the slack adjusters. Furthermore, many trucks lack the required clearance within the braking system to permit installation of an external device.

Therefore, there is a need in the art for a brake adjustment monitoring system that overcomes the shortcomings of the current technology. Such a device should rely on a minimal number of parts in order to reduce failure potential resulting from external sources. The device must be of sufficiently small size so that it can be fitted into any truck braking system. Ideally, such a device will be of relatively simple construction and operation and be relatively easy to install.

SUMMARY OF THE INVENTION

The brake monitor of the present invention addresses the above-stated needs in the art. The present invention provides a brake monitor capable of determining the travel distance of the brake's push rod. The specific distance will be measured and will be translated into a safe, a marginally safe, or an unsafe condition, communicable to the user.

The current brake monitor is comprised of a bracket that straddles the push rod clevis and has a transducer attached thereto. The clevis pin that rotatably connects the push rod clevis to the slack adjuster is fixedly attached to the slack adjuster and is received within the transducer. Travel of the push rod causes rotation of the clevis pin within the transducer. The specific distance of travel of the push rod will result in a specific angular rotation of the clevis pin within the transducer resulting in specific transducer output. The transducer output is received by an output device which translates the output, into any appropriate form, for receipt by the user.

The brake monitor of the present invention is relatively simple and straightforward to manufacture and install. It is relatively small and will fit into current air brake systems. Having relatively few parts, the device is generally immune to failure from the elements which plague other devices.

BRIEF DESCRIPTION OF THE DRAWINGS

FIG. 3 is a side elevation view of the brake monitor of the present invention installed on a brake in an applied position.

FIG. 4 is a rotated view of FIG. 3.

Similar reference numerals refer to similar parts throughout the several views of the drawings.

DETAILED DESCRIPTION OF THE PREFERRED EMBODIMENT

Figure 2:
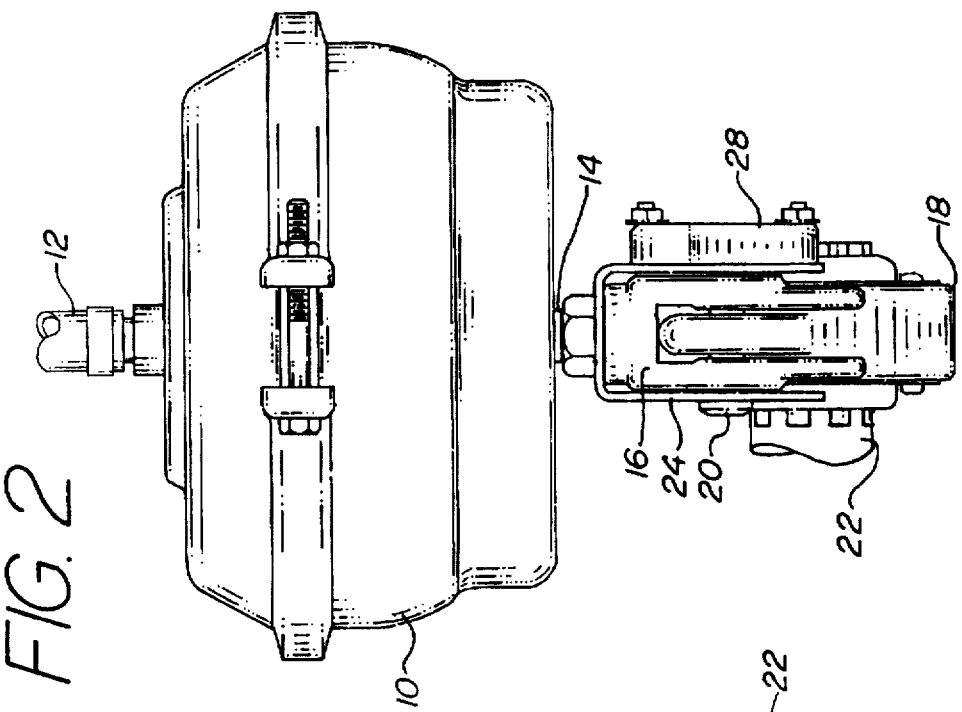
FIG. 2 is a rotated view of FIG. 1.
Figure 1:
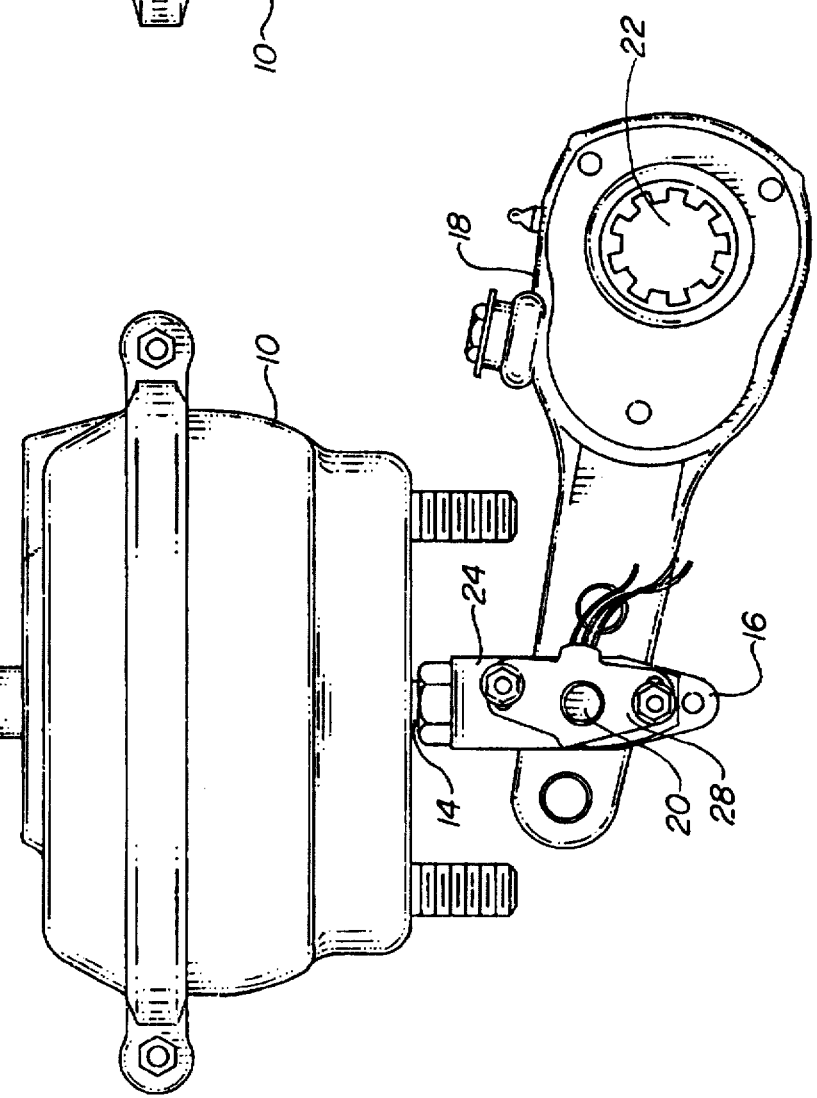
FIG. 1 is a side elevation view of the brake monitor of the present invention installed on a brake in a relaxed position.
Figure 5:
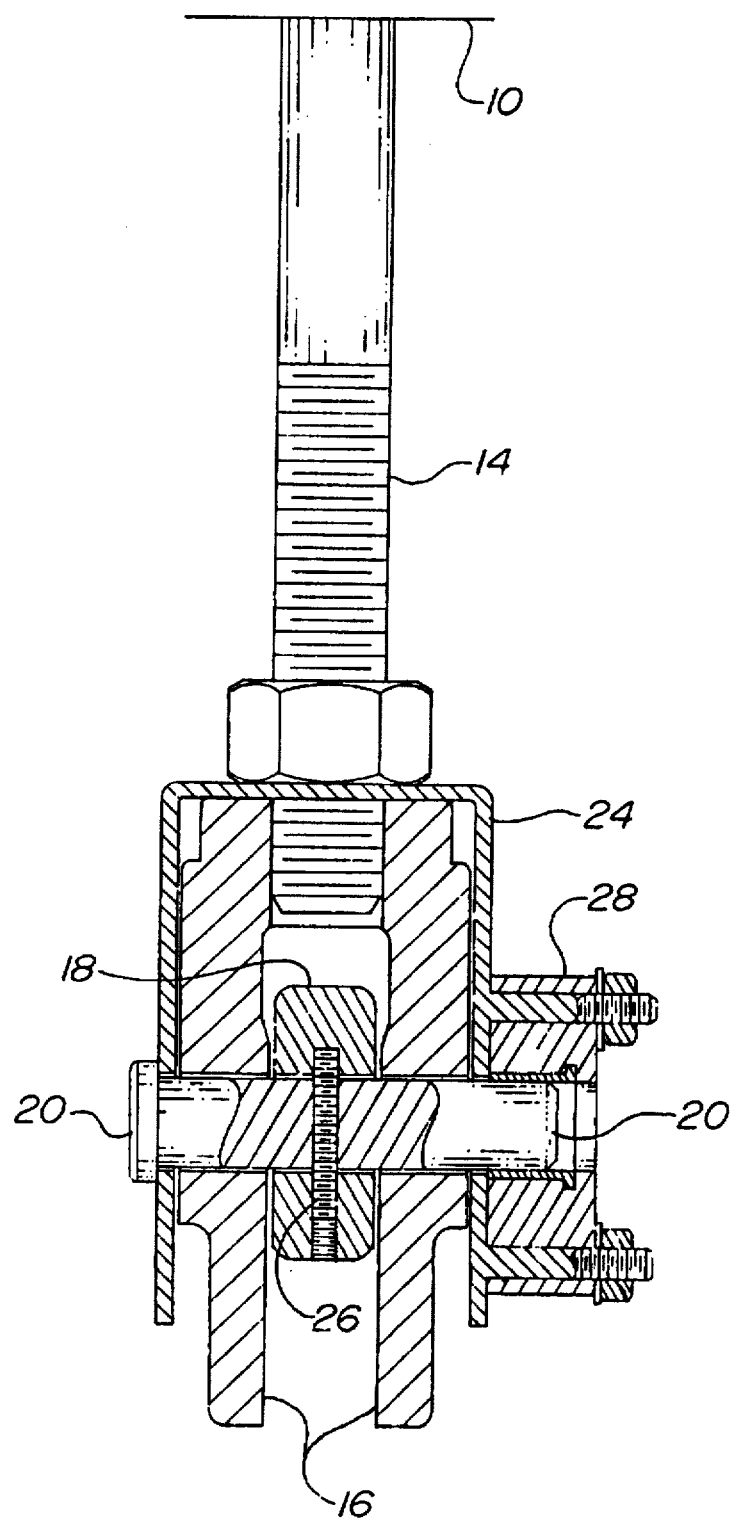
FIG. 5 is a cutaway view of FIG. 3.

Referring now to the drawings, an air brake system is disclosed. Generally, the brake system is comprised of an air chamber 10 having an air line 12 connected to the top thereof. A push rod 14 having a push rod clevis 16 on its end, extends outwardly from the air chamber 10. A slack adjuster 18 is rotatably connected to the push rod 14 by a clevis pin 20. The adjuster end of the slack adjuster 18 is connected to the brake, (not shown) which is located on the wheel of the vehicle, by an S-cam shaft 22.

In response to positive air pressure created within the air line 12 resulting from brake pedal depression, the air chamber 10 forces the push rod 14 outwardly, thereby causing outward articulation of the push rod end of the slack adjuster 18, which in turn activates the actual brake (not shown) on the wheel. The result is illustrated in FIGS. 3 and 4. Release of the brake pedal reverses this process.

In the present invention, the clevis pin 20, which is fixedly attached to the slack adjuster 18 by socket set screw 26, extends beyond the outer boundary of the push rod clevis 16 and is received within a transducer 28. The transducer 28 can be attached directly to the push rod clevis 16 or can be mounted to a bracket 24, wherein the bracket 24 straddles the push rod clevis 16.

Therefore, downward articulation of the push rod end of the slack adjuster 18 causes rotation of the clevis pin 20 within the transducer 28, causing an output from the transducer 28 that is responsive to clevis pin 20 rotation. Specific push rod travel distance results in specific angular rotation of the clevis pin 20, which in turn results in specific transducer output. This transducer output is received and decoded by an output device and the result communicated to the user. The transducer 28 can be of any appropriate type including electrical, electronic, electro-mechanical, or optical. The output device can be of any appropriate type including a digital display, an analog display, a video display, a light bank display, an audible communication or any combination thereof. One display can be associated with each brake monitor, or a master unit can be used for all brake monitors located on the vehicle including any trailers connected thereto, with each brake monitor properly multiplexed into the master unit. The individual units can be mounted on the vehicle in proximity to the wheel being monitored or can be mounted in the vehicle cab.

The master unit can be set up such to operate in various modes. The master unit can give an overall system report and thereafter identify and display the condition of any brake monitor or monitors that report a marginally safe or unsafe condition. The master unit can display the results from each monitor, cycling through each monitor one at a time. The master unit can display the results from a particular monitor selected by the user. The master unit must be able to accept input from a variable number of brake monitors so that monitors from a trailer or trailers can be attached to and detached from the master unit as desired.

The master unit or individual units can be equipped with memory, unerasable by the user, so that the immediate past result or results of the brake monitors are held within the memory and can be easily retrieved by investigative authorities after a vehicle collision.

While the invention has been particularly shown and described with reference to an embodiment thereof, it will be appreciated by those skilled in the art that various changes in form and detail may be made without departing from the spirit and scope of the invention.

I claim:

1. A brake monitor for installation on a brake system, the brake system includes an air chamber, a push rod having one end secured within the air chamber and having a push rod clevis on the opposing end, and a slack adjuster, comprising:

a clevis pin, having a first end and a second end, fixedly secured to the slack adjuster, for rotatable attachment of the slack adjuster to the clevis;

a transducer for receiving the first end of the clevis pin, wherein the output of the transducer is responsive to the rotation of the first end of the clevis within the transducer; and output means, in communication with the transducer, for communicating the output of the transducer in a user-understandable form.

2. The brake monitor as in claim 1 to further include a bracket straddling the clevis and securing the transducer.

3. The brake monitor as in claim 1 wherein the transducer is an electrical transducer.

4. The brake monitor as in claim 1 wherein the transducer is an electronic transducer.

5. The brake monitor as in claim 1 wherein the transducer is an electro-mechanical transducer.

6. The brake monitor as in claim 1 wherein the transducer is an optical transducer.

7. The brake monitor as in claim 1 wherein the output means has a memory permitting storage and retrieval of the user-understandable form.

* * * * *